(12) United States Patent
Moellmann (10) Patent No.: US 9,174,651 B2
(45) Date of Patent: *Nov. 3, 2015

(54) METHOD AND CIRCUIT ARRANGEMENT IN AN ELECTRONIC CONTROL UNIT OF A MOTOR VEHICLE FOR DETECTING FAULTS

(71) Applicant: Bayerische Motoren Werke Aktiengesellschaft, Munich (DE)

(72) Inventor: Joerg Moellmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,392

(22) Filed: Jul. 31, 2014

(65) Prior Publication Data

US 2014/0343817 A1    Nov. 20, 2014

Related U.S. Application Data

(63) Continuation of application No. PCT/EP2013/051709, filed on Jan. 29, 2013.

(30) Foreign Application Priority Data

Feb. 3, 2012    (DE) .......................... 10 2012 201 653

(51) Int. Cl.
*B60W 50/02*    (2012.01)
*B60W 50/00*    (2006.01)

(52) U.S. Cl.
CPC ... *B60W 50/0205* (2013.01); *B60W 2050/0006* (2013.01); *B60W 2050/021* (2013.01); *B60W 2520/28* (2013.01); *B60W 2540/10* (2013.01)

(58) Field of Classification Search
CPC ................. B60W 50/0205; B60W 2050/0006; B60W 2540/10; B60W 2520/28; B60W 2050/021

USPC .......................................................... 701/70
See application file for complete search history.

(56) References Cited

U.S. PATENT DOCUMENTS 4,856,798 A    8/1989    Buma et al.
5,880,568 A    3/1999    Bederna et al.
(Continued)

FOREIGN PATENT DOCUMENTS

DE    44 38 714 A1    5/1996
DE    196 12 857 A1    10/1997
(Continued)

OTHER PUBLICATIONS

International Search Report (PCT/ISA/210) dated Apr. 10, 2013 with English translation (seven pages).

(Continued)

*Primary Examiner* — Mary Cheung
*Assistant Examiner* — Yuen Wong
(74) *Attorney, Agent, or Firm* — Crowell & Moring LLP (57) ABSTRACT

In the case of a circuit arrangement in an electronic control unit of a motor vehicle for the detection of faults in an electronically controlled drive system, which is structured in at least two levels, a first function-controlling level and a second monitoring level, both levels acquire at least the accelerator pedal position as an input signal. The first level has a driver intention determination block for determining a quantity proportional to the desired longitudinal acceleration. The first level transmits this quantity as an input signal to a plausibility block of the second level. The plausibility block has at least one fault detection program, by which a fault can be detected when a defined correct relationship does not exist for a specified time period between the accelerator pedal position and/or the accelerator pedal position change with respect to the determined quantity proportional to the desired longitudinal acceleration—and this relationship is therefore implausible.

12 Claims, 9 Drawing Sheets

(56) References Cited

U.S. PATENT DOCUMENTS

| | | |
|---|---|---|
| 5,992,379 A | 11/1999 | Bruedigam |
| 6,038,503 A | 3/2000 | Wolf et al. |
| 6,052,642 A | 4/2000 | Wagner et al. |
| 6,407,554 B1 | 6/2002 | Godau et al. |
| 6,622,071 B2 | 9/2003 | Reuter |
| 7,437,218 B2 | 10/2008 | Funcke et al. |
| 7,469,179 B2 | 12/2008 | Thissen et al. |
| 8,725,348 B2 | 5/2014 | John et al. |
| 2007/0173985 A1* | 7/2007 | Thissen et al. .............. 701/1 |

FOREIGN PATENT DOCUMENTS

| | | |
|---|---|---|
| DE | 196 24 825 A1 | 1/1998 |
| DE | 196 38 278 A1 | 3/1998 |
| DE | 197 31 283 A1 | 1/1999 |
| DE | 197 31 972 A1 | 1/1999 |
| DE | 199 60 782 A1 | 6/2001 |
| DE | 100 45 611 A1 | 3/2002 |
| DE | 101 63 655 A1 | 7/2003 |
| DE | 102 49 689 A1 | 5/2004 |
| DE | 10 2004 047 925 A1 | 4/2006 |
| DE | 10 2008 014 511 A1 | 9/2009 |
| DE | 10 2009 002 900 A1 | 11/2010 |
| DE | 10 2011 002 805 A1 | 7/2012 |

OTHER PUBLICATIONS

International Search Report (PCT/ISA/210) dated Mar. 28, 2012 with English translation (five pages).

German Search Report dated Sep. 16, 2014 with partial English translation (Fourteen (14) pages).

* cited by examiner

METHOD AND CIRCUIT ARRANGEMENT IN AN ELECTRONIC CONTROL UNIT OF A MOTOR VEHICLE FOR DETECTING FAULTS

CROSS REFERENCE TO RELATED APPLICATIONS

This application is a continuation of PCT International Application No. PCT/EP2013/051709, filed Jan. 29, 2013, which claims priority under 35 U.S.C. §119 from German Patent Application No. 10 2012 201 653.8, filed Feb. 3, 2012, the entire disclosures of which are herein expressly incorporated by reference.

BACKGROUND AND SUMMARY OF THE INVENTION

The invention relates to a circuit arrangement in an electronic control unit of a motor vehicle for the detection of faults in an electronically controlled drive system.

As a result of standards prescribed by law (for example, ISO or CARB Standard Regulations), motor vehicle manufacturers have been required for many years to ensure that electronic control units or electronically controlled systems in motor vehicles, such as the digital engine control or the adaptive transmission control, are capable of self-diagnosing. So-called OBD (On-Board Diagnosis) systems, for example, were developed on that basis. One example of a design of an OBD system is contained in the applicant's German Patent Document DE 197 31 283 A1.

In this respect, the motor-vehicle-internal electronic control units have a large software capacity for self-diagnosis, in addition to the software capacity for the actual function control. One example of a self-diagnosis within the control unit is described in the applicant's German Patent Document DE 196 12 857 A1.

Up to now, the focus of the prescribed fault diagnosis has been the inherent security of each individual control unit or of each individual electronically controlled vehicle system separately. This results in high application expenditures. Particularly in the case of a motor or internal-combustion engine control (for spark-ignition engines or diesel engines), this results in a large number of stored characteristic diagrams when each programmed function has to be secured. One example, just of the expenditures of a function programming when inputting a desired drive power as a function of the accelerator pedal position is indicated in the applicant's German Patent Document DE 102 49 689 A1. If the characteristic diagrams illustrated there for the function programming were inherently securely diagnosed, approximately twice the programming expenditures or the storage space would be necessary because a fault recognition threshold would have to be stored for each characteristic curve of the characteristic diagrams.

Furthermore, from German Patent Document DE 44 38 714 A1, a so-called 3-level security concept currently widespread in practice is known—particularly in connection with electronic engine control units for the control of drive functions. The circuit arrangement according to the invention for the monitoring of drive functions is based on this 3-level security concept. The known 3-level security concept has a complex system architecture, which requires high development expenditures for control unit functionalities, which will become more and more complex and increasingly more cross-linked in the future.

Finally, in addition, reference is made to the applicant's German Patent Document DE 10 2011 002 805.6 (which is not a prior publication) which already contains a process for the detection of faults in an electronically controlled drive system of a motor vehicle, the system architecture for implementing the process not being addressed.

It is an object of the invention to simplify the system architecture of a security concept for the detection of faults in a drive system of a motor vehicle, particularly with the following objectives:

reducing development expenditures caused by additional functions and components,
avoiding multiple expenditures at various components,
restricting security-relevant communication between the control units,
demand addition from various components (functional and quantitative),
while ISO security evidence for cross-linked systems is to continue to be guaranteed.

According to the invention, this task is implemented by a circuit arrangement according to the invention in an electronic control unit of a motor vehicle for detecting faults in an electronically controlled drive system, which is structured in at least two levels, specifically, a first function-controlling level and a second monitoring level. The two levels acquire at least the accelerator pedal position as an input signal. The first level has a driver intention determination block for determining a quantity proportional to a desired longitudinal acceleration and transmits this quantity as an input signal to a plausibility block of the second level. The plausibility block has at least one fault detection program by which a fault can be detected when a defined (static or dynamic) correct relationship between the accelerator pedal position and/or an accelerator pedal position change with respect to a determined quantity proportional to a desired longitudinal acceleration (particularly for a specified time period) is not present, and this relationship is therefore implausible.

By way of the invention, the main security requirement is met, specifically the avoidance of an unintended acceleration and of an unintended spinning of wheels.

The invention is based on the conventional so-called 3-level security concept, which will be explained in detail below in connection with the description of the figures.

In the circuit arrangement according to the invention, a first fault detection program can preferably be run in the plausibility block, by which fault detection program a fault is detected when a defined desired longitudinal acceleration gradient dependent on an accelerator pedal position change is exceeded longer than for a specified time period (first defined correct relation is not present). For the implementation of the process according to the invention, the plausibility block of the control unit is programmed correspondingly.

The defined acceleration gradient dependent on an accelerator pedal position change is preferably limited by the maximal slope of a characteristic curve of the actual function extent of the first level by which, depending on the accelerator pedal position, a desired vehicle acceleration is specified. This maximal slope is empirically determined, particularly in driving tests, in order to determine which acceleration gradients can still just be reasonably handled or controlled by the driver. The defined acceleration gradient(s) dependent on an accelerator pedal change is/are stored in a memory of the control unit and are integrated in the plausibility block of the control unit for the implementation of the process according to the invention.

In a further development of the invention, while the accelerator pedal is not actuated, by use of the control unit, a second fault detection program can be run in the plausibility block, by which fault detection program a fault is recognized when a defined desired longitudinal acceleration threshold value preferably depending on the vehicle speed is exceeded longer than for a specified time period (second defined correct relation is not present).

In a further development of the invention, in the case of an non-activated drive slip control system, a third fault detection program can be run by the control unit in the plausibility block, by which a fault is detected if, when the accelerator pedal is not actuated or the accelerator pedal angle is decreasing, a longitudinal acceleration gradient determined from the rotational wheel speeds is positive for longer than for a specified time period, and simultaneously the desired longitudinal acceleration gradient not determined from the rotational wheels speeds is also positive (third defined correct relation is not present).

For this purpose, the plausibility block in the second level of the control unit receives, either directly or by way of a digital bus, information such as the rotational wheel speed values or the acceleration determined from the rotational wheel speeds, as input signal(s). The rotational wheel speeds are acquired by way of corresponding sensors in a known manner anyhow, for example, for a slip control.

Furthermore, a fourth fault detection program can be run in the plausibility block, by which a fault is detected when, in the case of a specified accelerator pedal position, a disproportionately high desired longitudinal acceleration is specified (fourth defined correct relation is not present).

By way of the invention, all required ISO Regulations are complied with:
- the new concept permits manageable analyses and documentations;
- the small number of input variables can be provided with the acquired ASIL level;
- the monitoring precision is at least comparable with the actual-engine torque monitoring of the previous security concept;
- the concept covers all fault mechanisms (such as spinning wheels, actuator system, etc).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
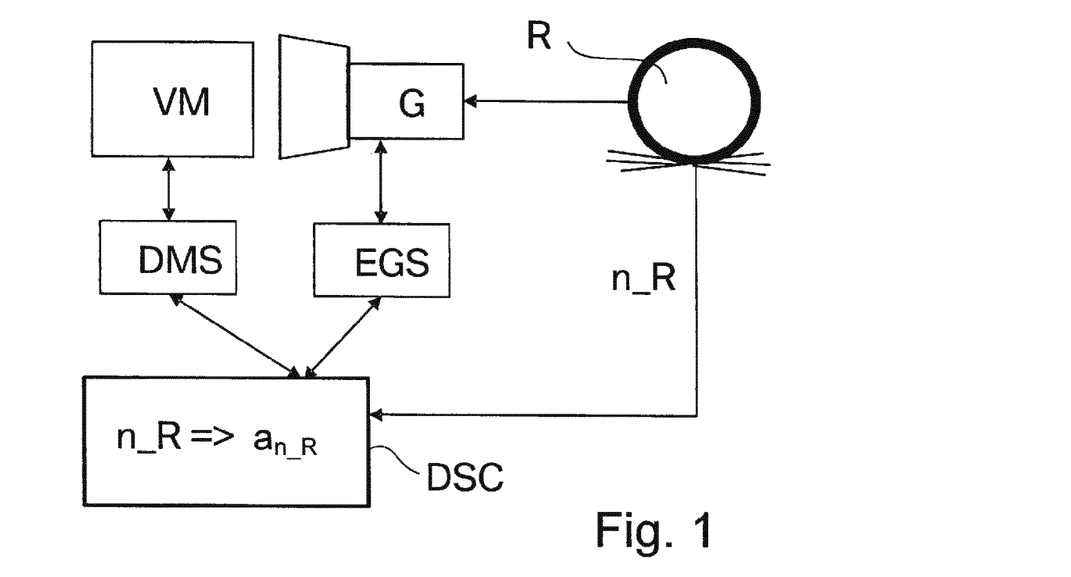
FIG. 1 is a schematic overview of components of a motor vehicle with a network of electronically controlled systems.

FIG. 1 is a schematic overview of components of a motor vehicle having a conceivable network of electronically controlled systems consisting an internal-combustion engine VM with an electronic engine control unit DMS, an automatic transmission G having an electronic transmission control unit EGS and of a brake system having an electronic brake control unit DSC. In addition, the wheels R of the vehicle are schematically illustrated, which have sensors for the acquisition of the rotational wheel speeds n_R. The signals for the acquisition of the rotational wheel speeds n_R are acquired, for example, in the brake control unit DSG. An acceleration $a_{n\_R}$ determined from the rotational wheel speeds is, for example, computed therefrom. The engine control unit DMS receives the acceleration $a_{n\_R}$ determined from the rotational wheel speeds, for example, by way of a digital bus connection which exists between all of the control units. For this purpose, FIG. 2 again is a schematic overview of a conceivable cross-linking of the electronic control units DMS, DSC, EGS and, optionally, also of a driver assistance control unit FAS by way of digital bus connections.

Figure 2:
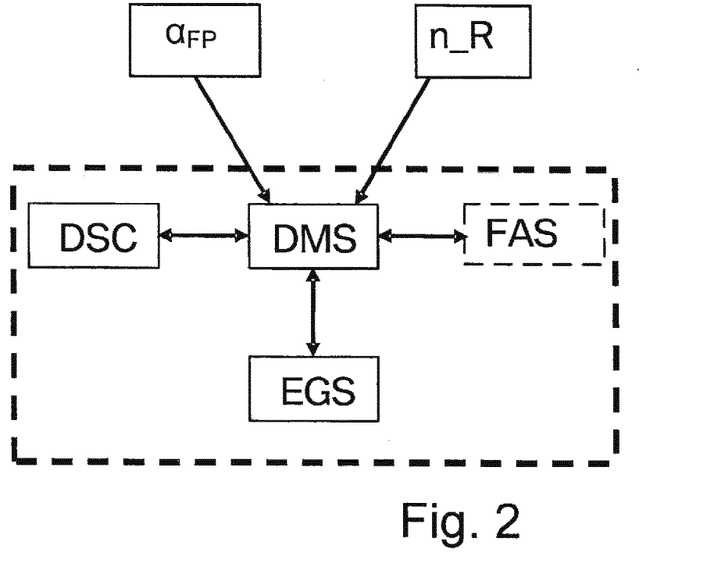
FIG. 2 is a schematic overview of a cross-linking of electronic control units to electrically controlled systems in a motor vehicle.

According to FIG. 2, the electronic engine control unit DMS receives at least the position of the accelerator pedal, for example, directly by way of the signal of a sensor for measuring the accelerator pedal angle $\alpha_{FP}$ as well as the rotational wheels speeds n_R as input signals.

Figure 3:
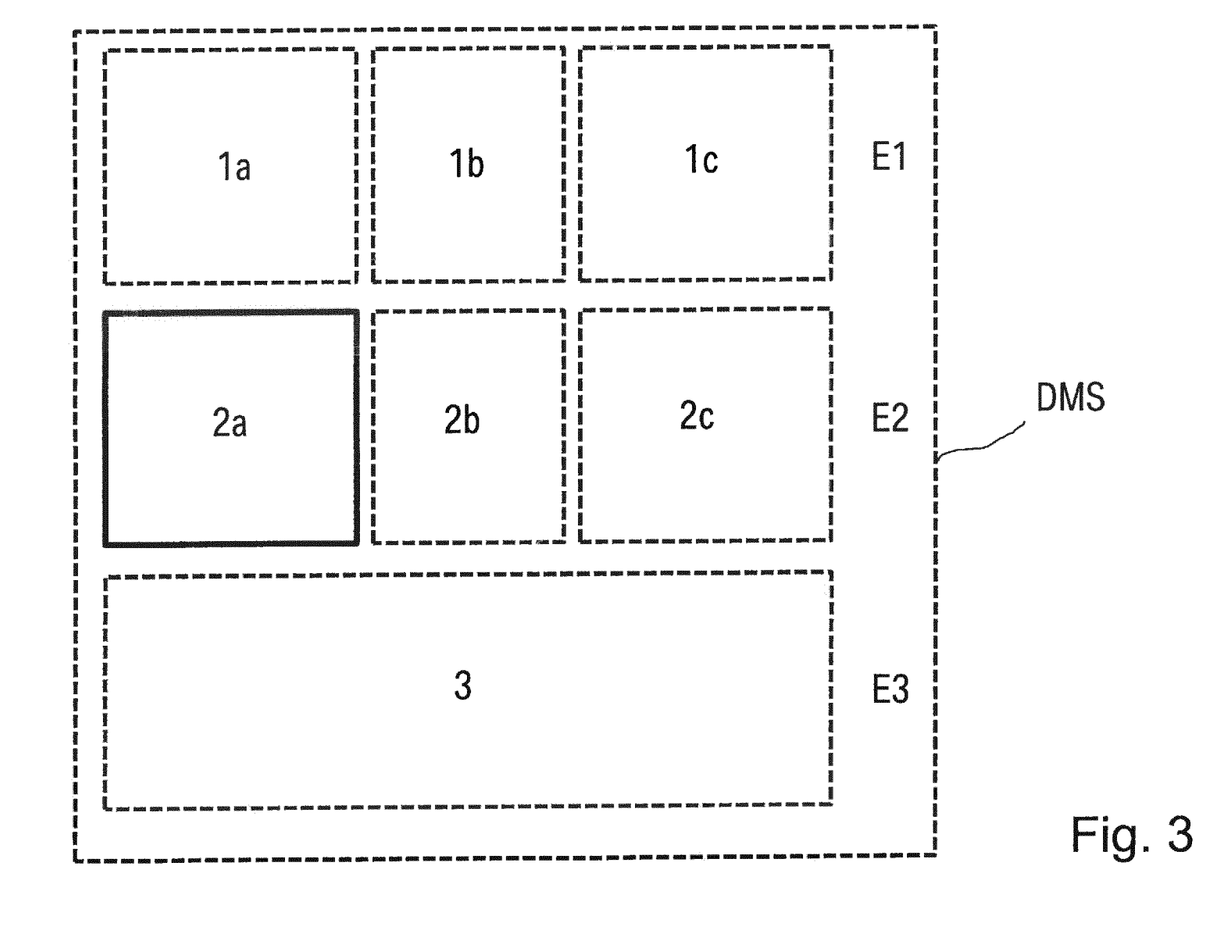
FIG. 3 is a schematic representation of the 3-level security concept according to the state of the art.

The circuit arrangement according to the embodiment is preferably integrated in block 2a for monitoring the driver intention acquisition in a 3-level security concept according to the state of the art, which is schematically illustrated in greater detail in FIG. 3. In the case of a 3-level security concept according to the state of the art, at least a first level E1, as a function-controlling level with the actual function software, and a second level E2, as the monitoring level with a monitoring software, are provided preferably in a single control unit, here particularly, in the electronic engine control unit DMS. A third level E3 is provided for the hardware monitoring. This level checks, for example, whether the computer for implementing the software at levels E1 and E3 is functioning properly. When certain faults are detected, the system—here the engine control—is either changed to a specified emergency operation or is switched off At the E1 level, the driver's intention is acquired in block 1a, and a desired drive torque, a desired longitudinal acceleration or a desired wheel torque is determined therefrom, which is forwarded into the block 1b for the desired input of the automatic control, and is finally converted in block 1c as the torque adjuster module to the actuating signals for the actuators (for example, the injection, ignition and air supply in the case of internal-combustion engine or to the driving current in the case of electric motors or in a hybrid drive). Input signals of the driver intention acquisition are particularly the accelerator pedal position or also inputs by an automatic cruise control apparatus (ACC) or a braking system (ABS, ASC, DSC).

Figure 5:
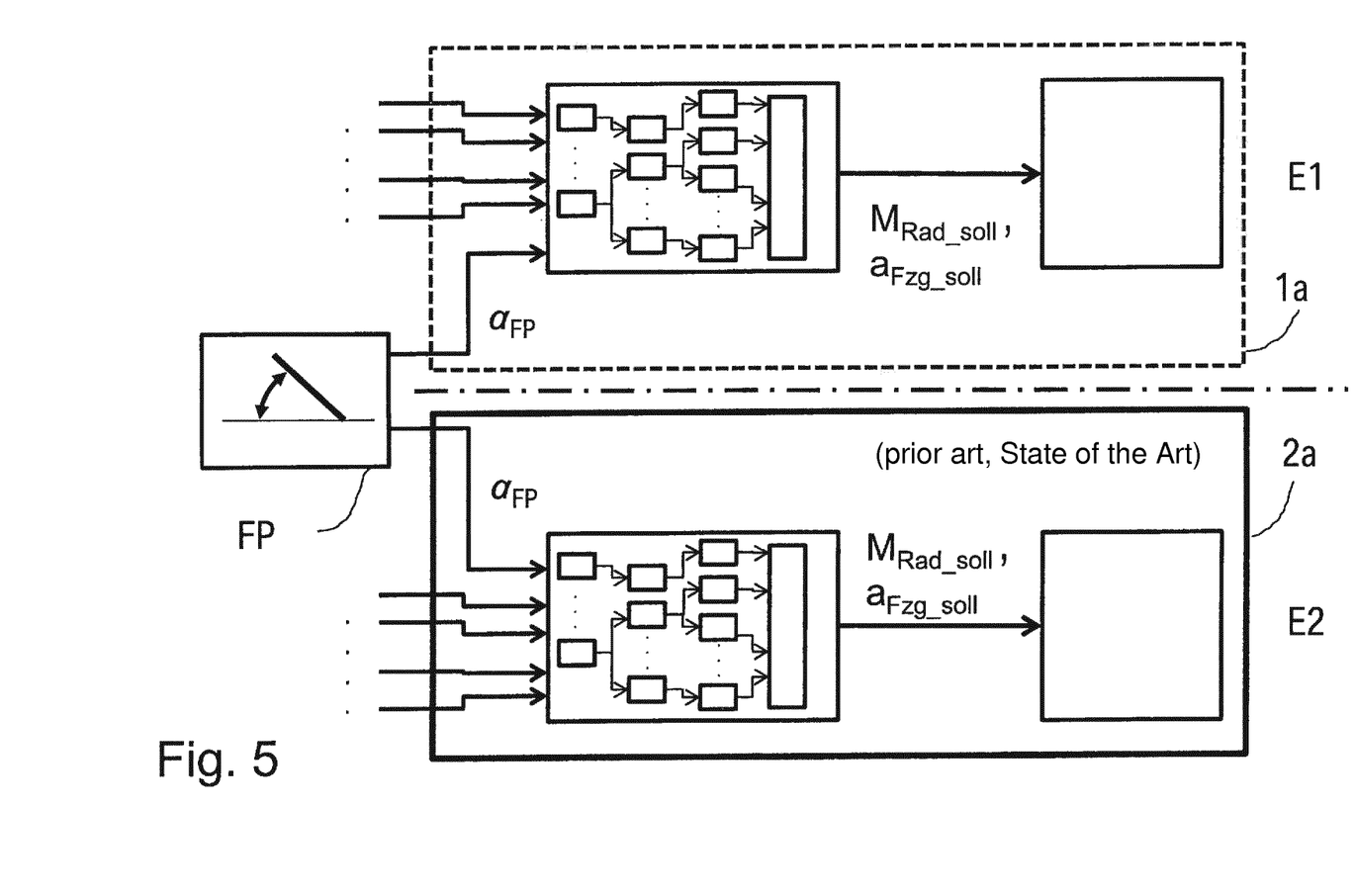
FIG. 5 is an overview of the monitoring structure of the driver intention acquisition according to the state of the art.

At the level E2, according to the state of the art, the monitoring of the driver intention acquisition is carried out in block 2a, in which case, the input signals of block 2a are the same as in block 1a, and the monitoring is carried out by a duplication of the driver intention acquisition. A more detailed representation of block 2a according to the state of the art is shown in FIG. 5. Accordingly, for the monitoring, the desired input is calculated and checked twice independently of the level E1. Subsequently, in block 2b of FIG. 3, a comparison is carried out of the desired values with the actual values of the longitudinal acceleration or a quantity proportional thereto. Finally, in block 2c, a monitoring of the torque adjusters takes place.

Figure 4:
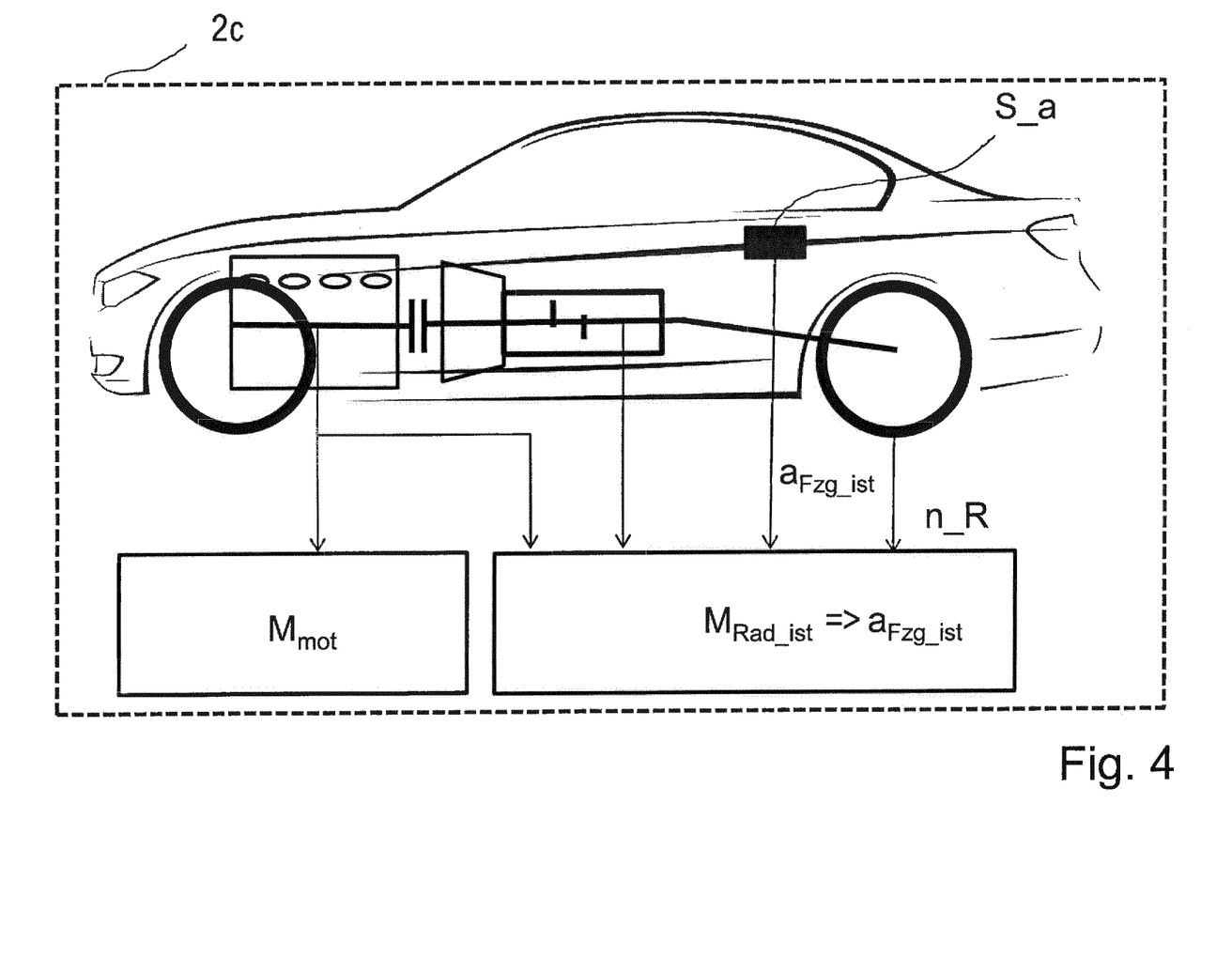
FIG. 4 is an overview of directly and indirectly acceleration-effective (or not) torques.

In FIG. 4, the torque adjuster is illustrated in connection with the monitoring, which torques are (directly proportionally) acceleration-effective. In this case, the engine torque $M_{mot}$ may not be or may only indirectly be acceleration-effective. Acceleration-effective torques are particularly the transmission output torque or the wheel torque $M_{Rad\_ist}$. These torques are directly proportional to the vehicle longitudinal acceleration $a_{Fzg\_ist}$ and their actual values can therefore be used, for example, together with a vehicle acceleration sensor S_a, for the desired-actual comparison in block 2b of level E2.

Figure 6:
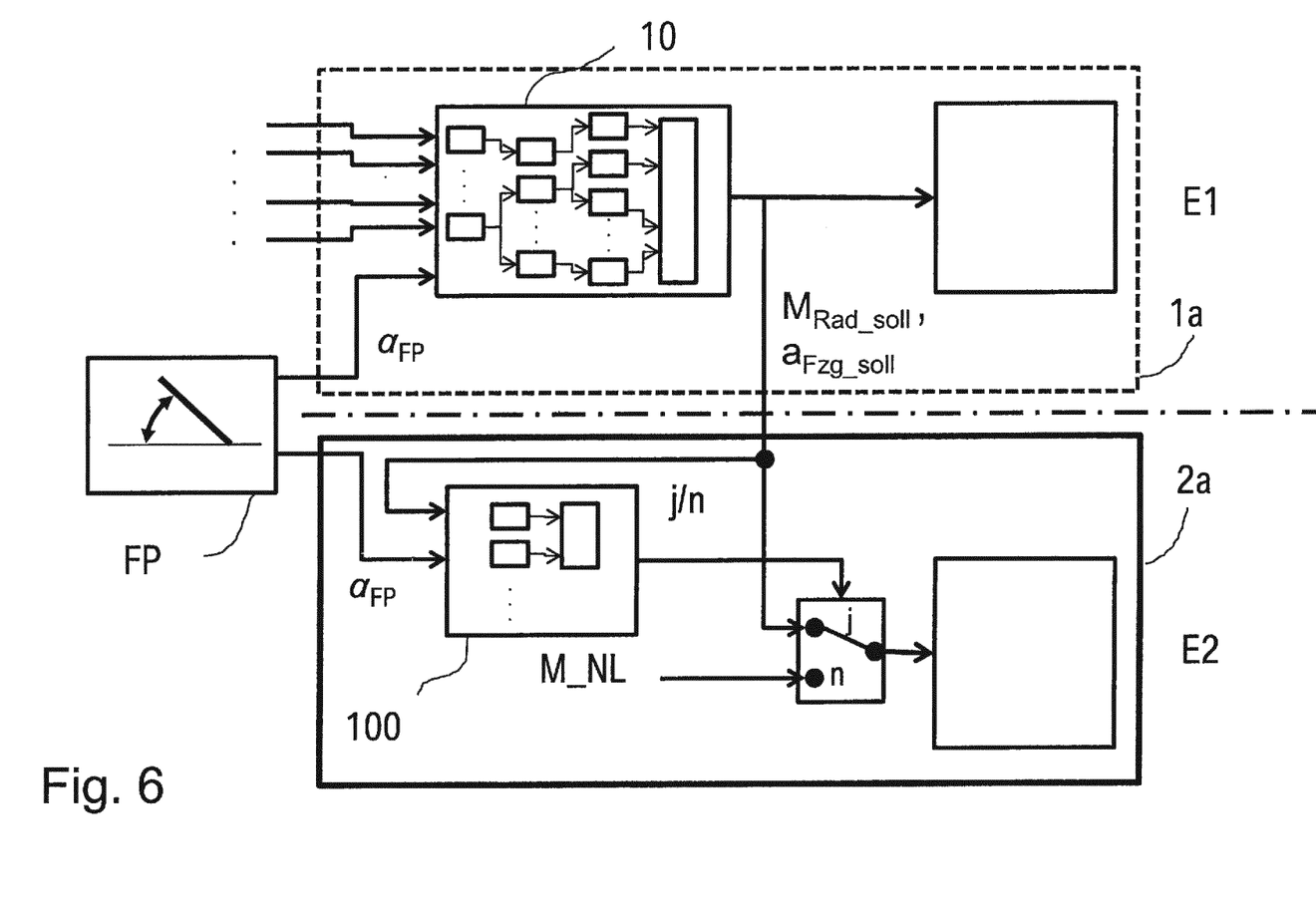
FIG. 6 is an overview of the monitoring structure of the driver intention acquisition according to an embodiment of the invention.

The circuit arrangement according to the invention here relates to block 2a for the monitoring of the driver intention acquisition and is illustrated in detail in FIG. 6. According to FIG. 6, instead of a duplication of the function software, an inherent plausibility block 100 is provided. The inherent plausibility block 100 has at least one fault detection program (SF_01, SF_02, SF_03, SF_04) by which a fault can be detected when a defined correct relationship does not exist between the accelerator pedal position ($\alpha_{FP}$) and/or the accelerator pedal position change ($\Delta\alpha_{FP}/\Delta t$) to the determined quantity ($M_{Rad\_soll}$ or $\alpha_{Fzg\_soll}$) proportional to the desired longitudinal acceleration for a specified time period (for examples of concrete fault detection programs, see FIG. 7). When no fault is detected ("j" for ok), the function is implemented in the desired manner. When a fault is detected ("n" for not ok), either a change takes place to an emergency operation, in which a reduced desired longitudinal acceleration or a reduced desired wheel torque M_NL is specified, or the control unit is switched off completely.

By use of the circuit arrangement according to the invention, as a result of the plausibility block 100, which acquires at least the accelerator pedal position ($\alpha_{FP}$) and the desired longitudinal acceleration of the motor vehicle $a_{Fzg\_soll}$ from block 1a of level E1 as input signals, for example, a first fault detection program SF_01 is implemented, unless another fault detection program precedes the first fault detection program. As illustrated by the broken line in FIG. 8, accordingly, a fault is basically detected when a defined desired longitudinal acceleration gradient $\Delta a_{Fzg\_soll}/\Delta t$ dependent on a accelerator pedal position change $\Delta\alpha_{FP}/\Delta t$ is exceeded longer than for a specified time period. By means of the solid line, the actual course is outlined which, in this case, would not result in a fault detection.

By way of the first fault detection program SF_01, in particular, acceleration changes are to be prevented which are not controlled by the driver (dynamic situation).

Figure 8:
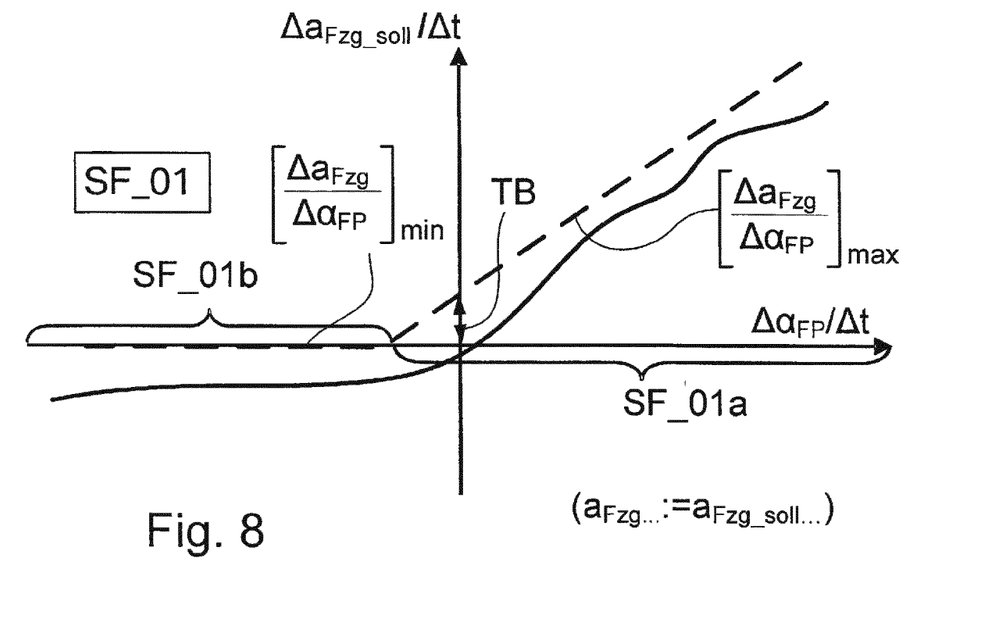
FIG. 8 is a graphical view of an example concerning the first fault detection program.
Figure 9:
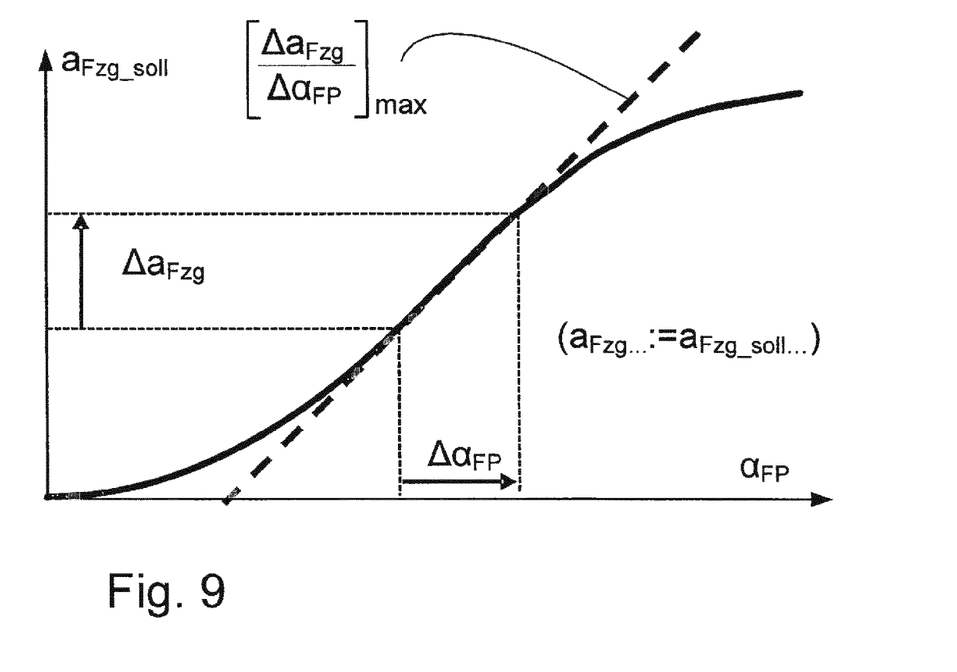
FIG. 9 is a graphical view of an example concerning determination of a defined acceleration gradient that depends on an accelerator pedal position change.

According to FIG. 8, by use of the first partial fault detection program SF_01a, particularly for positive accelerator pedal position changes $\Delta\alpha_{FP}/\Delta t$, an acceleration gradient $\Delta a_{Fzg\_soll}/\Delta t$ dependent on an accelerator pedal change $\Delta\alpha_{FP}/\Delta t$ is defined according to a maximally admissible acceleration change $[\Delta a_{Fzg\_soll}/\Delta\alpha_{FP}]_{max}$ derived from FIG. 9.

The defined acceleration gradient $\Delta a_{Fzg\_soll}/\Delta t$ dependent on an accelerator pedal position change $\Delta\alpha_{FP}/\Delta t$ is limited by the maximal slope $\Delta a_{Fzg\_soll}/\Delta\alpha_{FP}$ in a characteristic curve of the actual function extent, by which, as a function of the accelerator pedal position $\alpha_{FP}$, a desired vehicle acceleration $a_{Fzg\_soll}$ is specified. In this case, a tolerance range TB about $[\Delta a_{Fzg}/\Delta\alpha_{FP}]_{max}$ is preferably additionally permitted (see FIG. 8). According to FIG. 8, by use of a first partial fault detection program SF_01b, particularly for negative accelerator pedal position changes $\Delta\alpha_{FP}/\Delta t$, a minimal acceleration gradient $\Delta a_{Fzg\_soll}/\Delta t$, here of $[\Delta a_{Fzg}/\Delta\alpha_{FP}]_{min}$ dependent on an accelerator pedal position change $\Delta\alpha_{FP}/\Delta t$=zero is defined; because, as a result, a braking power is demanded by the driver by which an acceleration increase should never take place.

Figure 10:
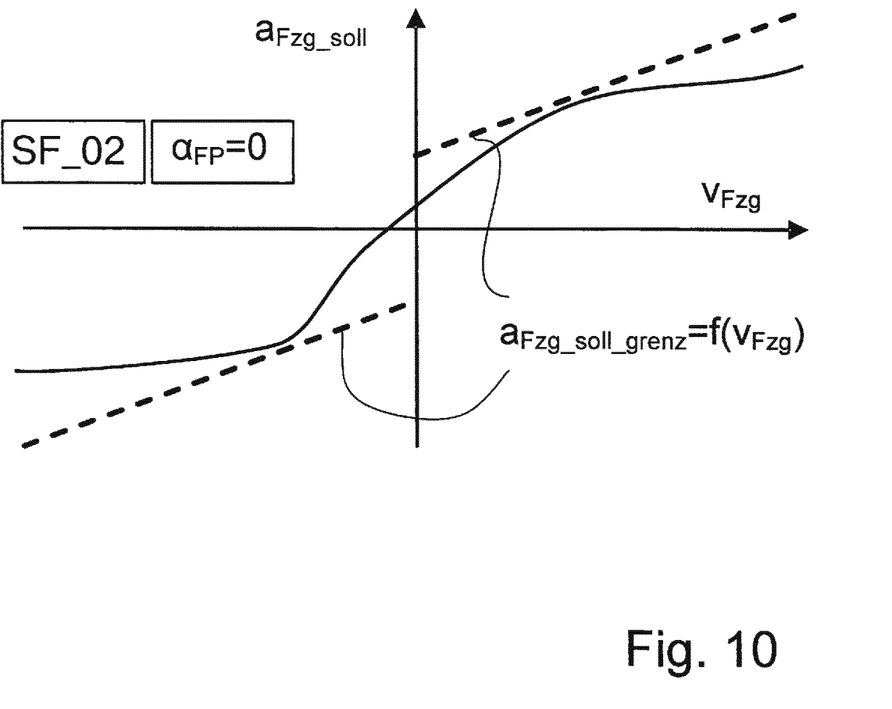
FIG. 10 is a graphical view of an example concerning the second fault detection program.

FIG. 10 illustrates a second fault detection program SF_02 which replaces the first fault detection program SF_01 when the accelerator pedal $\alpha_{FP}$=0 is not actuated. Accordingly, when the accelerator pedal $\alpha_{FP}$=0 is not actuated, a fault is detected in the plausibility block 100 independently of the first level E1 when a defined acceleration threshold value $a_{Fzg\_soll}$ preferably dependent on the vehicle speed $v_{Fzg}$ is exceeded longer than for a specified time period; because, also in the coasting operation, there should be no higher acceleration.

Figure 11:
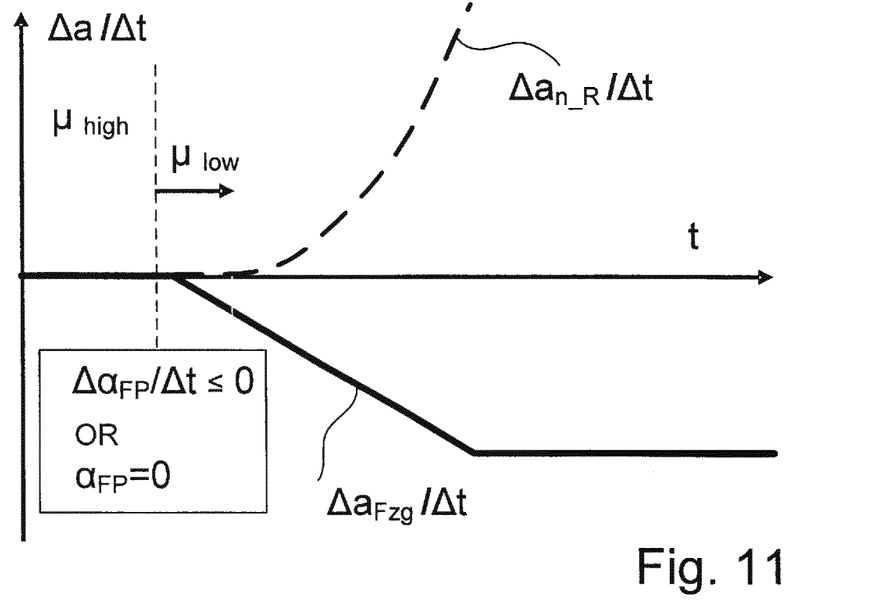
FIG. 11 is a graphical view of an example concerning the third fault detection program where no fault is detected.
Figure 12:
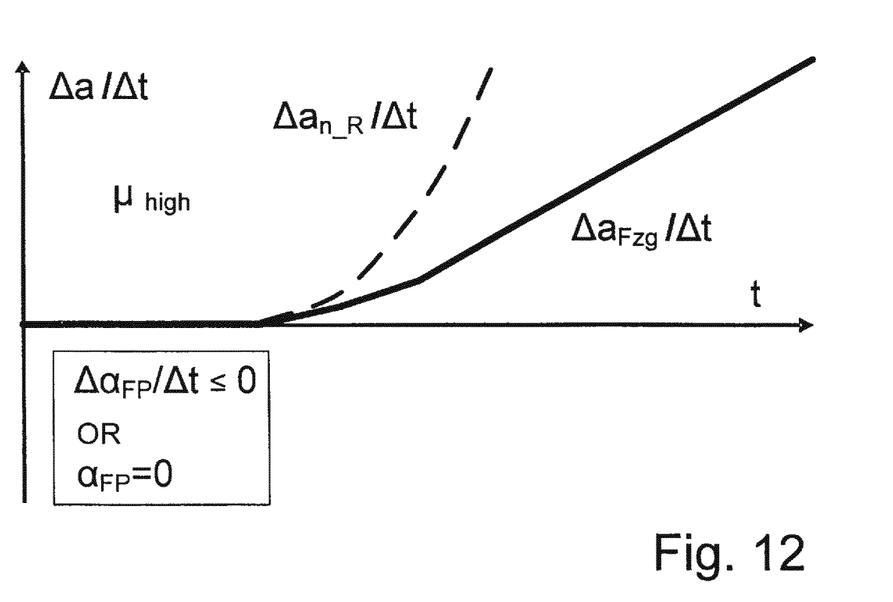
FIG. 12 is a graphical view of an example concerning the third fault detection program, where a fault is detected.

FIGS. 11 and 12 show an additional special case of a not activated wheel slip control system when wheel slip occurs that is not settled by the brake control unit DSC. In this case, a third fault detection program SF_03 is implemented in addition to or instead of the first fault detection program SF-01 in the plausibility block 100, by which a fault is detected when, while the accelerator pedal $\alpha_{FP}$=0 is not actuated or while the accelerator pedal angle is decreasing $\Delta\alpha_{FP}/\Delta t$<0, an acceleration gradient $\Delta a_{n\_R}/\Delta t$ not determined from the rotational wheel speeds n_R is positive longer than for a specified time period and simultaneously a vehicle acceleration gradient $\Delta a_{Fzg}/\Delta t$ determined from the rotational wheel speeds n_R is also positive. By way of this fault detection, the engine control unit DMS, instead of the wheel slip control system or the brake control unit DSC, can carry out a drive torque reduction and thus provide a stable driving condition.

Accordingly, no fault is detected in FIG. 11 because the trigger for the wheel slip is a change from a high friction value $\mu_{high}$ to a low friction value $\mu_{low}$ while the drive torque remains the same: Courses of the two acceleration gradients $\Delta a_{n\_R}/\Delta t$ and $\Delta a_{Fzg}/\Delta t$ occur in opposite directions (always with $a_{Fzg}$:$a_{Fzg\_soll}$). According to FIG. 12, however, a fault is detected within the scope of the function extent because, despite the unchanging high friction value $\mu_{high}$, obviously as a result of a fault in the drive system (for example, in the internal-combustion engine control unit DMS or in the transmission control unit EGS, FIG. 1) the drive torque is increased prohibitively. By comparing the course directions of the acceleration gradients $\Delta a_{n\_R}/\Delta t$ and of the vehicle acceleration gradient $\Delta a_{Fzg}/\Delta t$ (positive courses in FIG. 12), it is excluded according to FIG. 12 that the permissible situation according to FIG. 11 is present (courses in opposite directions).

Figure 7:
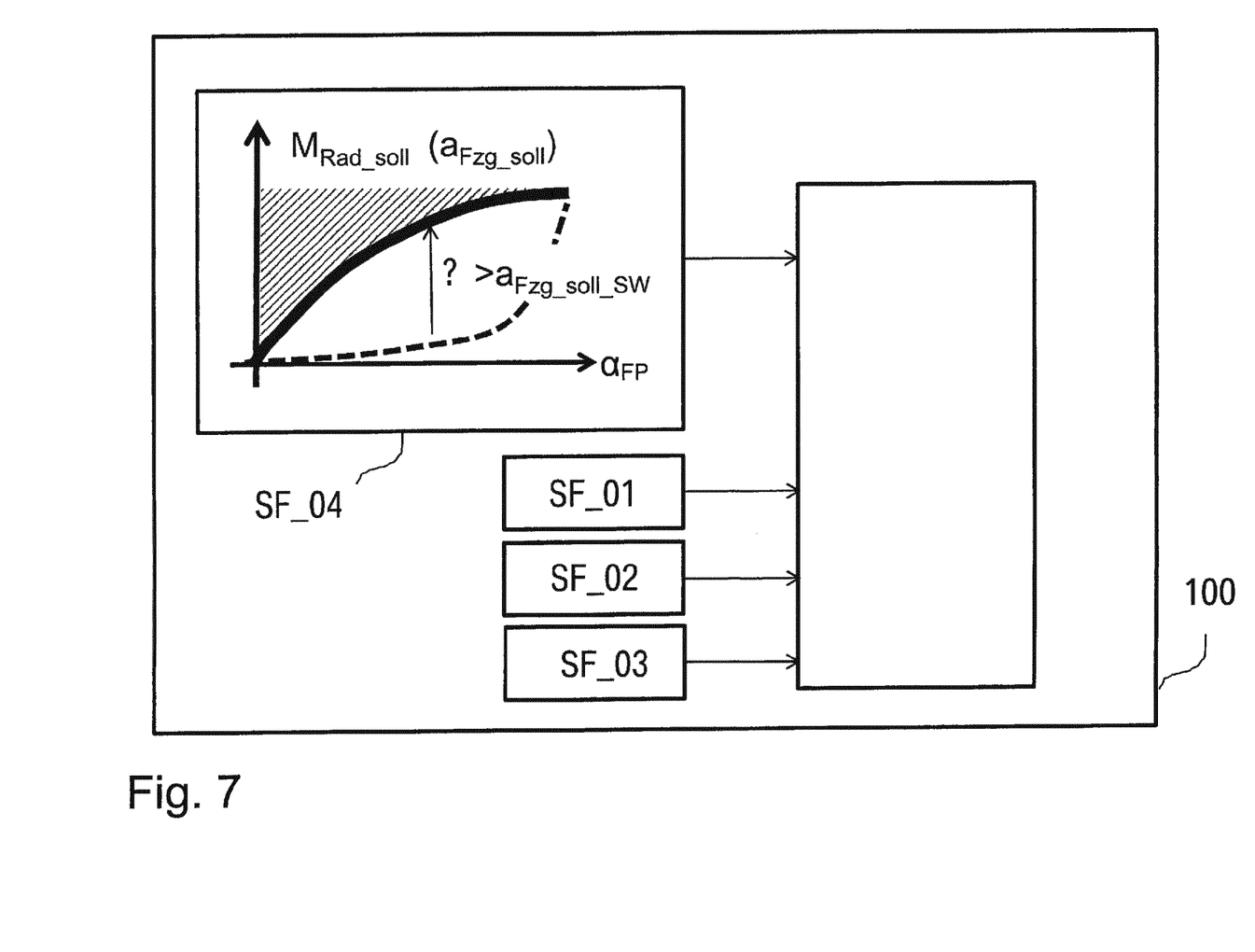
FIG. 7 is an overview of the possible fault detection programs within the monitoring structure of the driver intention acquisition.

In addition, a fourth fault detection program SF_04 is illustrated in FIG. 7 which can be carried out in the plausibility block 100. Here, a fault is detected when, in the case of a defined constant accelerator pedal position ($\alpha_{FP}$=constant) not equal to zero, a specified longitudinal acceleration threshold value $a_{Fzg\_soll\_SW}$ is exceeded. Accelerations, which are not controlled by the driver, are thereby to be prevented (static situation).

Basically, by use of all fault detection programs SF_01 (in the form of an acceleration change monitoring), SF_02 (in the form of an acceleration coasting monitoring) SF_03 (in the form of preventing unintentionally spinning wheels) and/or SF_04 (in the form of an absolute threshold monitoring), in the event of a fault detection, the drive torque will be reduced or completely switched off.

By way of this circuit arrangement according to the invention, a system-covering, but simple, monitoring concept is created which is assigned to the engine control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for detecting faults in an electronically controlled drive system of a motor vehicle, comprising:
   an electronic control unit for controlling a drive function of the motor vehicle, the electronic control unit having a first function-controlling level and a second monitoring level, wherein
   both the first function-controlling level and second monitoring level of the electronic control unit acquire at least an accelerator pedal position as an input signal,
   the first function-controlling level of the electronic control unit determines a quantity proportional to a desired longitudinal acceleration and transmits the determined quantity as an input signal to a plausibility block of the second level of the electronic control unit,
   the plausibility block of the second level of the electronic control unit implements at least one fault detection program to detect a fault when a defined relationship is not satisfied between the accelerator pedal position and/or an accelerator pedal position change and the determined quantity proportional to the desired longitudinal acceleration,
   when no fault is detected, the drive function is implemented, and
   when a fault is detected, an emergency operation of the drive function is implemented by the electronic control unit, or the electronic control unit is switched off completely.

2. The arrangement according to claim 1, wherein
   the plausibility block has a first fault detection program, by which the fault is detected when a defined desired longitudinal acceleration gradient ($\Delta M_{Rad\_soll}/\Delta t$ or $\Delta a_{Fzg\_soll}/\Delta t$) dependent on the accelerator pedal position change ($\Delta \alpha_{FP}/\Delta t$) is exceeded for a specified time period.

3. The arrangement according to claim 2, wherein
   the defined desired longitudinal acceleration gradient ($\Delta a_{Fzg\_soll}/\Delta t$) dependent on the accelerator pedal position change ($\Delta \alpha_{FP}/\Delta t$) is limited by a maximal slope ($[\Delta a_{Fzg\_soll}/\Delta \alpha_{FP}]_{max}$) of a characteristic curve of an actual function of the first level, wherein the desired longitudinal acceleration ($a_{Fzg\_soll}$) is specified by the maximal slope as a function of the accelerator pedal position ($\Delta_{FP}$).

4. The arrangement according to claim 3, wherein
   when the accelerator pedal is not actuated ($\alpha_{FP}=0$), a second fault detection program of the plausibility block of the second level of the electronic control unit is implemented by which the fault is detected when a defined desired longitudinal acceleration threshold value ($a_{Fzg\_soll\_grenz}=f(v_{Fzg})$) is exceeded for a specified time period.

5. The arrangement according to claim 4, wherein
   when a wheel slip control system (DSC) is not activated during a wheel slip, a third fault detection program of the plausibility block of the second level of the electronic control unit is implemented, by which the fault is detected when, while the accelerator pedal ($\alpha_{FP}=0$) is not actuated or while an accelerator pedal angle is decreasing $\Delta \alpha_{FP}/\Delta t<0$, an acceleration gradient ($\Delta a_{n\_R}/\Delta t$) that is not determined from rotational wheel speeds is positive for a specified time period and, simultaneously, a vehicle acceleration gradient ($\Delta a_{Fzg}/\Delta t$) that is determined from the rotational wheel speeds is also positive.

6. The arrangement according to claim 5, wherein
   a fourth fault detection program of the plausibility block of the second level of the electronic control unit is implemented, by which the fault is detected when a disproportionately high desired longitudinal acceleration ($a_{Fzg\_soll\_SW}$) is present for a specified constant accelerator pedal position ($\alpha_{FP}$).

7. A method of detecting faults in a motor vehicle equipped with an electronic control unit provided with a first function-controlling level and a second monitoring level of the electronic control unit, the method comprising acts of:
   receiving, in both the first function-controlling level and the second monitoring level of the electronic control unit, at least an accelerator pedal position of the motor vehicle as an input signal;
   determining, in the first function-controlling level of the electronic control unit, a quantity proportional to a desired longitudinal acceleration;
   transmitting the determined quantity as an input signal to a plausibility block of the second monitoring level of the electronic control unit;
   detecting, by a fault detection program of the plausibility block of the second monitoring level of the electronic control unit, a fault when a defined relationship is not satisfied between the accelerator pedal position and/or an accelerator pedal position change and the determined quantity,
   when no fault is detected, the drive function is implemented, and
   when a fault is detected, an emergency operation of the drive function is implemented by the electronic control unit, or the electronic control unit is switched off completely.

8. The method according to claim 7, further comprising an act of:
   detecting, by a first fault detection program of the plausibility block of the second monitoring level of the electronic control unit, the fault when a defined desired longitudinal acceleration gradient dependent on the accelerator pedal position change is exceeded for a specified time period.

9. The method according to claim 8, wherein
   the defined desired longitudinal acceleration gradient is limited by a maximal slope of a characteristic curve of an actual function of the first function-controlling level, by which, as a function of the accelerator pedal position, the desired longitudinal acceleration is specified.

10. The method according to claim 8, further comprising an act of:
   when the accelerator pedal is not actuated, detecting the fault with a second fault detection program of the plausibility block of the second monitoring level of the electronic control unit when a defined desired longitudinal acceleration threshold value is exceeded for a specified time period.

11. The method according to claim 10, further comprising an act of:

when a wheel slip control system is not activated during a wheel slip, detecting, by a third fault detection program of the plausibility block of the second monitoring level of the electronic control unit, the fault while the accelerator pedal is not actuated or while an accelerator pedal angle is decreasing, when an acceleration gradient that is not determined from rotational wheel speeds is positive for a specified time period and, simultaneously, the desired longitudinal acceleration gradient that is determined from the rotational wheel speeds is positive.

12. The method according to claim 11, further comprising an act of:

detecting, by a fourth fault detection program of the plausibility block of the second monitoring level of the electronic control unit, the fault when a a specified longitudinal acceleration threshold value is exceeded for a specified constant accelerator pedal position.

* * * * *